H. D. WILKES.
PENMANSHIP GUIDE CHART.
APPLICATION FILED OCT. 17, 1916.

1,253,758. Patented Jan. 15, 1918.

WITNESSES

INVENTOR
H. D. Wilkes
BY
ATTORNEYS

333
UNITED STATES PATENT OFFICE.

HARRY D. WILKES, OF NEW YORK, N. Y.

PENMANSHIP GUIDE-CHART.

1,253,758.   Specification of Letters Patent.   Patented Jan. 15, 1918.

Application filed October 17, 1916.  Serial No. 126,086.

*To all whom it may concern:*

Be it known that I, HARRY D. WILKES, a citizen of the United States, and a resident of the city of New York, borough of Manhattan, in the county and State of New York, have invented a new and Improved Penmanship Guide-Chart, of which the following is a full, clear, and exact description.

Among the principal objects which the present invention has in view are: to control the movements of a writing instrument for governing the height of the letters in written composition; to form a guide governing the line spacing of the written composition; and to provide a simple and inexpensive device for accomplishing the above objects.

Drawings.

Description.

Figure 1:
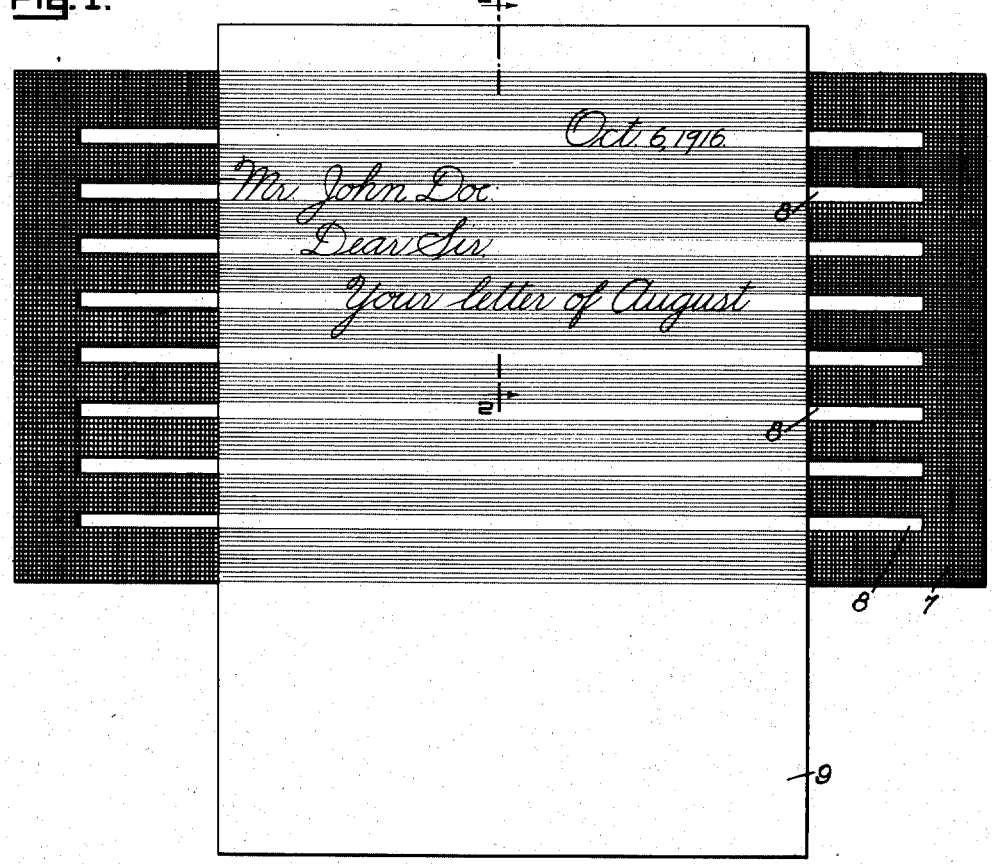
Figure 1 is a top plan view showing a sheet of paper having placed thereon written words, the letters whereof have been formed in correspondence with a chart constructed and arranged in accordance with the present invention and shown as installed in service relation to said sheet.
Figure 2:
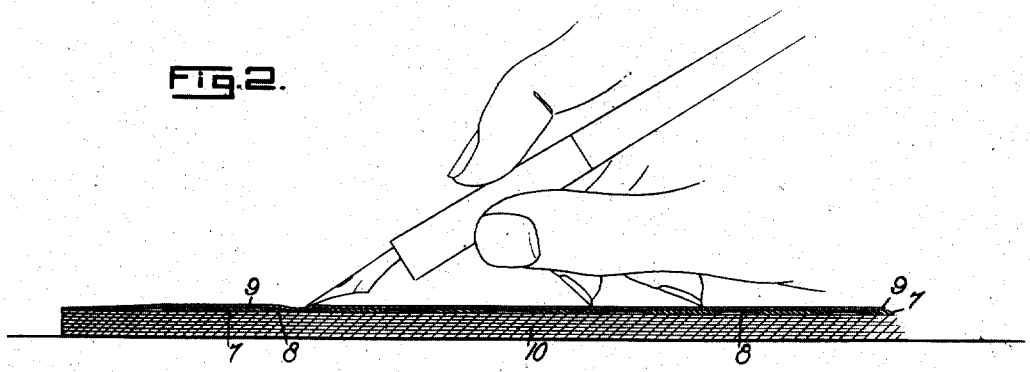
Fig. 2 is a sectional view on an enlarged scale taken as on the line 2—2 in Fig. 1.

The chart 7 is formed of any suitable material and is provided lengthwise thereof with slots 8. The slots 8 are spaced apart as shown best in Fig. 1 of the drawings to indicate the proper or desired spaces with lines of writing to be placed on the sheet 9. The sheet 9 is partially transparent as indicated in the drawings, so that when the sheets are formed in a pad 10, as indicated in Fig. 2 of the drawings, the surface of the sheet directly below that being written upon is visible between the relatively darkened areas of the chart 7 between the slots 8.

When using a chart such as described, it is evident that the body of the sheet 9 above the slots 8 is depressed thereinto when writing on said sheet above said slots. It is also obvious that as the point of the pencil, pen, or stylus is moved to the upper limit of any of the slots, it impinges upon the upper confining edge and thus indicates to the penman that the upper limit of the letter being formed has been reached. The same is true of the edge of the slot forming the lower boundary of the slot 8.

When one has become accustomed to using said chart 7, the hand very quickly detects and responds to the indication of the limit of the letter being formed, so that the upstroke or downstroke in the formation of said letter is instantly determined or initiated.

It is obvious that when the writing requires the extension beyond the limits of the slots 8, this is readily accomplished by ignoring the indication above mentioned. But it is obvious that when doing this, the writer is permitted to form the extension of the letter in conformity with the extension of other letters of a similar character.

The chart may be used to advantage by any penman but is particularly adapted for use as an accessory in training children to write. While the child is compelled to learn the form of the letters, its hand is trained to form said letters of even or regular size.

It will be noticed that in the specific construction illustrated the plate has its guide spaces formed by the longitudinal parallel slots, the upper and lower walls of the respective slots forming parallel walls adapted to limit the movement of a pen, pencil or other writing implement in both directions, and the said plate is darkened adjacent the said limiting walls so that the location of the said walls will be indicated by sight through a transpicuous writing surface placed over the chart, and the said walls will also form physical stops for such writing implements in use, thus presenting a simple embodiment of the invention which appeals to two of the senses, to wit, the sense of sight, and the sense of feeling.

Claim.

A chart for use in writing, comprising a plate of suitable material having therein guide spaces having parallel upper and lower walls adapted to limit the movement of a writing implement in both directions, the said plate being darkened adjacent said walls whereby the location of the said walls will be indicated by sight through a transpicuous writing surface placed thereover, and the said walls will form physical stops for the writing implement, all substantially as and for the purposes set forth.

HARRY D. WILKES.